(12) United States Patent
Zhang et al.

(10) Patent No.: US 7,003,099 B1
(45) Date of Patent: Feb. 21, 2006

(54) SMALL ARRAY MICROPHONE FOR ACOUSTIC ECHO CANCELLATION AND NOISE SUPPRESSION

(75) Inventors: Ming Zhang, Cupertino, CA (US); Wan-Chieh Pai, Cupertino, CA (US)

(73) Assignee: Fortmedia, Inc., Cupertino, CA (US)

( * ) Notice: Subject to any disclaimer, the term of this patent is extended or adjusted under 35 U.S.C. 154(b) by 482 days.

(21) Appl. No.: 10/371,150

(22) Filed: Feb. 21, 2003

Related U.S. Application Data

(60) Provisional application No. 60/426,661, filed on Nov. 15, 2002.

(51) Int. Cl.
 *H04B 3/23* (2006.01)
 *H04B 15/02* (2006.01)

(52) U.S. Cl. ........................... 379/406.03; 379/406.05; 379/392.01; 379/388.02; 381/94.3

(58) Field of Classification Search ................................ 379/388.01–388.02, 392.01, 406.02–406.03, 379/406.05, 406.12–406.14; 381/94.3, 94.7
See application file for complete search history.

(56) References Cited

U.S. PATENT DOCUMENTS

| | | | | |
|---|---|---|---|---|
| 5,058,153 A | * | 10/1991 | Carew et al. | 379/392.01 |
| 5,157,653 A | * | 10/1992 | Genter | 379/406.05 |
| 5,544,250 A | * | 8/1996 | Urbanski | 381/94.3 |
| 6,088,668 A | * | 7/2000 | Zack | 381/94.3 |
| 6,122,384 A | * | 9/2000 | Mauro | 381/94.3 |
| 6,160,886 A | * | 12/2000 | Romesburg et al. | 379/406.05 |
| 6,195,430 B1 | * | 2/2001 | Eriksson et al. | 379/406.05 |
| 6,404,886 B1 | * | 6/2002 | Yoshida et al. | 379/406.05 |
| 6,442,275 B1 | * | 8/2002 | Diethorn | 379/406.05 |
| 6,546,099 B1 | * | 4/2003 | Janse | 379/406.05 |
| 6,700,979 B1 | * | 3/2004 | Washiya | 379/392.01 |

* cited by examiner

*Primary Examiner*—Daniel Swerdlow
(74) *Attorney, Agent, or Firm*—Dinh & Associates (57) ABSTRACT

Techniques for canceling echo and suppressing noise using an array microphone and signal processing. In one system, at least two microphones form an array microphone and provide at least two microphone input signals. Each input signal may be processed by an echo canceller unit to provide a corresponding intermediate signal having some echo removed. An echo cancellation control unit receives the intermediate signals and derives a first gain used for echo cancellation. A noise suppression control unit provides at least one control signal used for noise suppression based on background noise detected in the intermediate signals. An echo cancellation and noise suppression unit derives a second gain based on the control signal(s), cancels echo in a designated intermediate signal based on the first gain, and suppresses noise in this intermediate signal based on the second gain. The signal processing may be performed in the frequency domain.

23 Claims, 6 Drawing Sheets

SMALL ARRAY MICROPHONE FOR ACOUSTIC ECHO CANCELLATION AND NOISE SUPPRESSION

CROSS-REFERENCES TO RELATED APPLICATIONS

This application claims the benefit of provisional U.S. Application Ser. No. 60/426,661, entitled "Small Array Microphone for Acoustic Echo Cancellation and Noise Suppression," filed Nov. 15, 2002, which is incorporated herein by reference in its entirety for all purposes.

This application is further related to U.S. application Ser. No. 10/193,689, entitled "Channel Control and Post Filter for Acoustic Echo Cancellation," and U.S. application Ser. No. 10/193,739, entitled "Acoustic Echo Cancellation with Adaptive Step Size and Stability Control," both filed on Jul. 10, 2002, assigned to the assignee of the present application and incorporated herein by reference in their entirety for all purposes.

BACKGROUND OF THE INVENTION

The present invention relates generally to signal processing, and more specifically to techniques for canceling acoustic echo and suppressing noise using array microphone.

Full-duplex hands-free communication systems are commonly used for many applications, such as speakerphone, hands-free car kit, teleconferencing system, cellular phone, hands-free voice recognition devices, and so on. For each of these systems, one or more microphones in the system are used to pick up an acoustic signal emitted by a speaking user, which is then processed and transmitted to a remote user. However, the microphones may also pick up undesirable reflections of the acoustic signal from the borders of an enclosure, such as a room or a car compartment. The propagation paths for the reflections may change due to various factors such as, for example, movement of the microphones, loudspeaker, and/or speaking user, volume changes on the loudspeaker, and environment changes. As a result, the electro-acoustic circuit in the system may become unstable and produce howling, which is highly undesirable.

In the case of a telecommunication system, a speech signal from a remote speaking user is outputted from a loudspeaker, and portions of this speech signal may be reflected to the microphones and transmitted back to the remote user. This acoustic disturbance is referred to as echo. In general, users are annoyed by hearing their own voice delayed, for example, by the path of the system.

Echo cancellation is often required in many communication systems to suppress echo as well as to avoid howling effects. For example, echo cancellation is typically used in full-duplex communication environments where the speaker and microphone may be located some distance away from a user. Examples of such environments include hands-free speakerphone (e.g., in a vehicle or a room), Internet/Intranet Protocol phone, and so on.

Conventionally, echo cancellation is achieved by a circuit that employs an adaptive filter. The adaptive filter performs echo cancellation by deriving an estimate of the echo based on a reference signal, which may be a line output from a communication or telematics device such as a cellular phone or some other device. The adaptive filter is typically able to remove the portion of the echo that is correlated to the reference signal.

However, conventional echo cancellation techniques are not able to remove certain portions of the echo. For example, nonlinearity of the circuitry in the system (e.g., the speaker, analog-to-digital (A/D) converter, digital-to-analog (D/A) converter, and so on) generates echo that is not correlated to the reference signal. This type of echo cannot be canceled by conventional echo cancellation techniques that employ only an adaptive filter. Moreover, user movement, position changes in the microphones and loudspeakers, and volume changes can cause the echo path to vary. This results in time-varying echo that typically cannot be canceled very well, particularly if the echo path changes faster than the convergence rate of the adaptive filter.

Nonlinear echo cancellation techniques may be used to attempt to cancel the residual echo that is not canceled by the adaptive filter in the echo canceller. However, these techniques typically cannot cancel echo due to serious nonlinearity. Nonlinear echo may be caused by various conditions such as an overdriven loudspeaker, a microphone in saturation, mechanical vibration, and so on. These techniques also cannot handle high volume echo. Moreover, some conventional nonlinear echo cancellation techniques, such as a center clipper, can cause voice distortion by cutting off low power voice signal. Other conventional nonlinear echo cancellation techniques, such as conventional post filters, also cannot deal with large echo and serious nonlinearity.

Many communication systems and voice recognition devices are designed for use in noisy environments. Examples of such applications include communication and/or voice recognition in cars or mobile environments (e.g., on street). For these applications, the microphones in the system pick up not only the desired voice but noise as well. The noise can degrade the quality of voice communication and speech recognition performance if it is not dealt with in an effective manner.

Noise suppression is often required in many communication systems and voice recognition devices to suppress noise and to improve communication quality and voice recognition performance. Noise suppression may be achieved using various techniques, which may be classified as single microphone techniques and array microphone techniques.

Single microphone noise reduction techniques typically use spectral subtraction to reduce the amount of noise in a noisy speech signal. With spectral subtraction based techniques, the power spectrum of the noise is estimated and then subtracted from the power spectrum of the noisy speech signal. The phase of the resultant enhanced speech signal is maintained equal to the phase of the noisy speech signal so that the speech signal is minimally distorted. The spectral subtraction based techniques are effective in reducing stationary noise but are not very effective in reducing non-stationary noise. Moreover, even for stationary noise reduction, these techniques can cause distortion in the speech signal at low signal-to-noise ratio (SNR).

Array microphone noise reduction techniques use multiple microphones that are placed at different locations and are separated from each other by some minimum distance to form a beam. Conventionally, the beam is used to pick up speech that is then used to reduce the amount of noise picked up outside of the beam. The array microphone techniques can suppress non-stationary noise but are not efficient in reducing noise in a reverberant environment (i.e., diffuse noise).

For many applications, noise may continually vary and may further change dramatically dues to changes in the environment. Moreover, different applications may be associated with different type and amount of noise. For example, the noise in a car at high speed will likely be different and higher than the noise in conference room. Since different noise reduction techniques are effective at dealing with different types of noise and since different applications may be associated with different types and levels of noise, it is normally difficult to obtain good performance for a wide range of environments and noise conditions based on a single specific noise suppression technique and a single set of parameter values.

As can be seen, techniques that can effectively cancel echo and suppress noise in communication systems and voice recognition devices are highly desirable.

SUMMARY OF THE INVENTION

Techniques are provided herein for canceling echo and suppressing noise using an array microphone and signal processing. These techniques are effective at (1) suppressing residual echo that is not canceled by conventional echo cancellation and post filter techniques, and (2) reducing stationary and non-stationary ambient noise as well as diffused noise, which cannot be handled by single microphone systems. The inventive techniques can provide improved echo cancellation and noise suppression performance even with changing environment, enhanced voice quality, and faster voice recognition rate, all which are highly desirable for various applications such as hands-free full-duplex communication, voice recognition, and so on.

A specific embodiment of the invention provides an echo cancellation and noise suppression system comprising at least two microphones, an echo cancellation control unit, a noise estimator, a noise suppression control unit, and an echo cancellation and noise suppression unit. The microphones form an array microphone and provide microphone input signals, one of which is designated as the main channel. The microphones may be of various types (e.g., uni-directional and omni-directional) and may be arranged in various manners. Each microphone input signal may be processed by an echo canceller unit to provide a corresponding intermediate signal having a portion of the echo removed.

The echo cancellation control unit receives the intermediate signals and derives a first gain used for echo cancellation. The noise estimator detects for background noise in the intermediate signals and provide a first signal (e.g., an SNR) indicative of the detected background noise. The noise suppression control unit receives the first signal and determines at least one control signal used for noise suppression. The echo cancellation and noise suppression unit derives a second gain based on the control signal(s), cancels echo in the intermediate signal for the main channel based on the first gain, and suppresses noise in this intermediate signal based on the second gain.

The echo cancellation may be performed based on detected activity at the far-end and the noise suppression may be performed based on detected activity at the near-end. The echo cancellation and noise suppression may be performed in the frequency domain and the signal processing may be performed for each frequency bin (i.e., on a per-bin basis).

Various other aspects, embodiments, and features of the invention are also provided, as described in further detail below.

The foregoing, together with other aspects of this invention, will become more apparent when referring to the following specification, claims, and accompanying drawings.

DESCRIPTION OF THE SPECIFIC EMBODIMENTS

For clarity, various signals and controls for the acoustic echo cancellation and noise suppression systems described herein are labeled with either lower case or upper case symbols. Time-variant signals and controls are labeled with "(n)" and "(m)", where n denotes sample time and m denote frame index. Frequency-variant signals and controls are labeled with "(k,m)", where k denotes frequency bin index. Lower case symbols (e.g., r(n)) are used to denote time-domain signals, and upper case symbols (e.g., E(k,m)) are used to denote frequency-domain signals.

Figure 1:
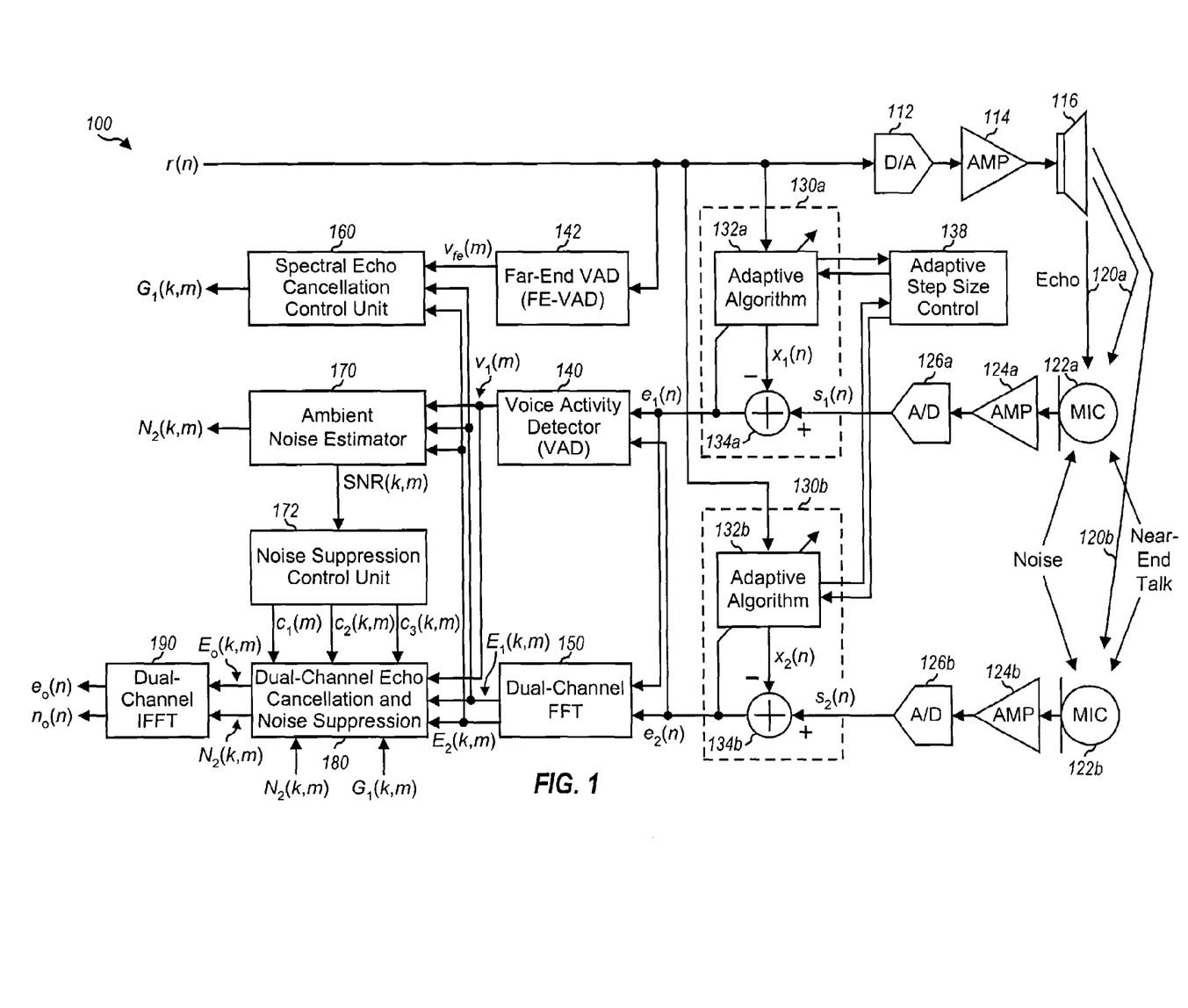
FIG. 1 shows a block diagram of an echo cancellation and noise suppression system.

FIG. 1 shows a block diagram of an echo cancellation and noise suppression system 100, which is a specific embodiment of the invention. For system 100, multiple microphones are placed in a manner to form an array microphone. Various configurations may be used for the array microphone and two exemplary configurations are briefly described for illustration. In a first configuration, the array microphone comprises one uni-directional microphone and one omni-directional microphone. The uni-directional microphone is directed at a near-end talker and provides a signal for a first channel. The omni-directional microphone picks up signal and noise from all directions and provides a signal for a second channel. In a second configuration, the array microphone comprises two uni-directional microphones. The first uni-directional microphone is directed at a near-end talker and the second uni-directional microphone faces away from the near-end talker. For clarity and without loss of generality, the second configuration is used for system 100 and described in detail below.

In the "output path", a digital signal r(n), which includes audio activity (e.g., speech) from a far-end source, is converted to an analog signal by a digital-to-analog (D/A) converter 112, amplified by a power amplifier 114, and outputted from a speaker 116 to one or more near-end users. A far-end user is one who is located away (or remote) from system 100, and a near-end user is one who is located within the vicinity of system 100. The far-end signal r(n) is also used as a reference signal for adaptive filters 130a and 130b.

In the first "input path", a uni-directional microphone 122a is placed such that it faces a near-end user and is used as the main channel. Microphone 122a receives audio activity from the near-end user (i.e., near-end voice or talk), local ambient noise, and echo from speaker 116 via echo paths 120a. The signal from microphone 122a is amplified by an amplifier 124a and further digitized by an analog-to-digital (A/D) converter 126a to provide a digitized first microphone input signal $s_1(n)$.

In the second input path, a uni-directional microphone 122b is placed in close proximity to microphone 122a but such that is faces away from the near-end user and is used as the secondary channel. Microphone 122b also receives audio activity from the near-end user, local ambient noise, and echo from speaker 116 via echo paths 120b, which may be similar to echo paths 120a. The signal from microphone 122b is amplified by an amplifier 124b and further digitized by an A/D converter 126b to provide a digitized second microphone input signal $s_2(n)$.

Adaptive filter 130a receives the reference signal $r(n)$, the first microphone signal $s_1(n)$, and a step size signal $u(n)$ from an adaptive step size control unit 138. Adaptive filter 130a then filters the reference signal $r(n)$ based on a first set of filter coefficients $H_1(n)$ to provide an echo estimate signal $x_1(n)$, which is then subtracted from the first microphone signal $s_1(n)$ by a summer 134a to provide a first intermediate signal $e_1(n)$. The signal $e_1(n)$ is fed back to an adaptive algorithm 132a and used with the step size signal $u(n)$ to update the filter coefficients $H_1(n)$.

Similarly, adaptive filter 130b receives and filters the reference signal $r(n)$ based on a second set of filter coefficients $H_2(n)$ to provide an echo estimate signal $x_2(n)$, which is then subtracted from the second microphone signal $s_2(n)$ by a summer 134b to provide a second intermediate signal $e_2(n)$. The signal $e_2(n)$ is used along with the step size signal $u(n)$ by an adaptive algorithm 132b to update the filter coefficients $H_2(n)$.

A voice activity detector (VAD) 140 receives and processes the signals $e_2(n)$ and $e_2(n)$ to detect for the presence of near-end voice activity. Near-end voice and near-end talk refer to voice activity from a talking user located within the vicinity of system 100. VAD 140 provides a detection signal $v_1(m)$ that indicates whether or not near-end voice has been detected. The detection signal $v_1(m)$ is updated for each frame of B samples.

A far-end voice activity detector (FE-VAD) 142 receives and processes the far-end signal $r(n)$ to detect for the presence of far-end voice activity. Far-end voice and far-end talk refer to voice activity from a talking user located remote from system 100. FE-VAD 142 provides a far-end voice detection signal $v_{fe}(m)$ that indicates whether or not far-end voice has been detected. The detection signal $v_{fe}(m)$ is also updated for each frame.

A dual-channel fast Fourier transform (FFT) unit 150 receives the signals $e_1(n)$ and $e_2(n)$, transforms each signal to the frequency domain using fast Fourier transform, and provides two corresponding frequency-domain signals $E_1(k,m)$ and $E_2(k,m)$. In particular, each frame of B samples for the signal $e_i(n)$ is transformed to obtained a corresponding set of B coefficients for the signal $E_i(k,m)$, where $i \in \{1, 2\}$ and m is the index of the frame. B is indicative of the FFT size and may be any integer that is a power of two (e.g., 32, 64, 128, 256, and so on).

A dual-channel spectral echo cancellation control unit 160 receives the far-end detection signal $v_{fe}(m)$ and the signals $E_1(k,m)$ and $E_2(k,m)$. Control unit 160 then processes these signals to obtain a frequency-domain gain $G_1(k,m)$ used for echo cancellation. The gain $G_1(k,m)$ is derived using additional information provided by two microphones in the array microphone to further suppress echo.

An ambient noise estimator 170 receives the detection signal $v_1(m)$ and the signals $E_1(k,m)$ and $E_2(k,m)$ and estimates the background near-end noise. Noise estimator 170 first estimates the signal component in $E_1(k,m)$ and the noise component in $E_2(k,m)$. Noise estimator 170 then computes a signal-to-noise ratio $SNR(k,m)$ based on the estimated signal and noise components.

A noise suppression control unit 172 receives and processes the $SNR(k,m)$ to provide three control signals $c_1(m)$, $c_2(k,m)$, and $c_3(k,m)$. The control signal $c_1(m)$ is a function of frame number m but not frequency bin index k, and the control signals $c_2(k,m)$ and $c_3(k,m)$ are functions of both frame number m and frequency bin index k. The three control signals are used to control (1) the selection of either a single microphone solution or an array microphone solution and (2) the particular settings to use for various noise suppression parameters based on the estimated background noise (which determines the amount of noise suppression to perform), as described in further detail below.

A dual-channel echo cancellation and noise suppression unit 180 receives the signals $E_1(k,m)$ and $E_2(k,m)$, the noise estimate signal $N_2(k,m)$, the detection signal $v_1(m)$, the first gain $G_1(k,m)$, and the three controls $c_1(m)$, $c_2(k,m)$, and $c_3(k,m)$. Unit 180 then processes these signals to obtain an overall frequency-domain gain $G(k,m)$ that is used for both echo cancellation and noise suppression for the signal $E_1(k,m)$ to obtain an output signal $E_o(k,m)$. The echo cancellation and noise suppression are described in further detail below.

A dual-channel inverse FFT unit 190 receives the frequency-domain output signal $E_0(k,m)$ and the noise estimate signal $N_2(k,m)$, transforms these two signals to the time domain, and provides the corresponding time-domain signals $e_o(n)$ and $n_o(n)$. The noise signal $n_o(n)$ may be used to reinsert (or paste) some amount of noise back into the output signal $e_o(n)$ so that the noise level in the output signal is approximately constant. This may be necessary, for example, so that changes in the noise level is not mistaken by a subsequent processing unit as changes in the near-end environment or some other factors. The "noise paste" process is described in detail in the aforementioned U.S. patent application Ser. No. 10/193,689.

Figure 2A:
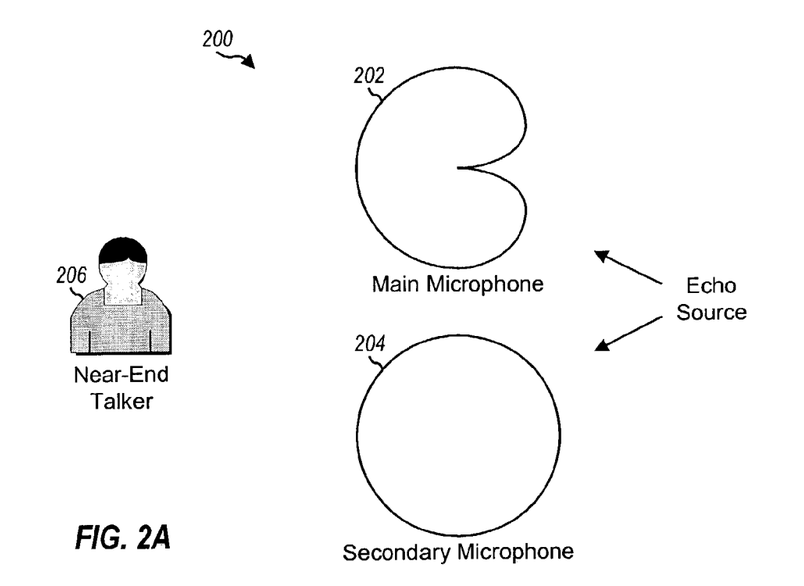
FIGS. 2A and 2B show two exemplary array microphone configurations.

FIG. 2A shows an exemplary configuration for an array microphone 200. For this configuration, array microphone 200 comprises a uni-directional microphone 202 and an omni-directional microphone 204. The main lobe of uni-directional microphone 202 faces toward a near-end talker 206 and away from the source of echo (e.g., near-end speakers). Omni-directional microphone 204 is placed in close proximity to uni-directional microphone 202. Uni-directional microphone 202 is referred to as the first or main channel (or main microphone), and omni-directional microphone 204 is referred to as the second or secondary channel (or secondary microphone). The near-end speakers are not placed facing in the same direction as uni-directional microphone 202 toward the near-end talker (i.e., not on the same line between the speaker and microphone 202). The near-end speakers may be placed facing the near-end talker but at a different angle from that of the main microphone, or placed so that they are not directly facing the near-end talker.

Figure 2B:
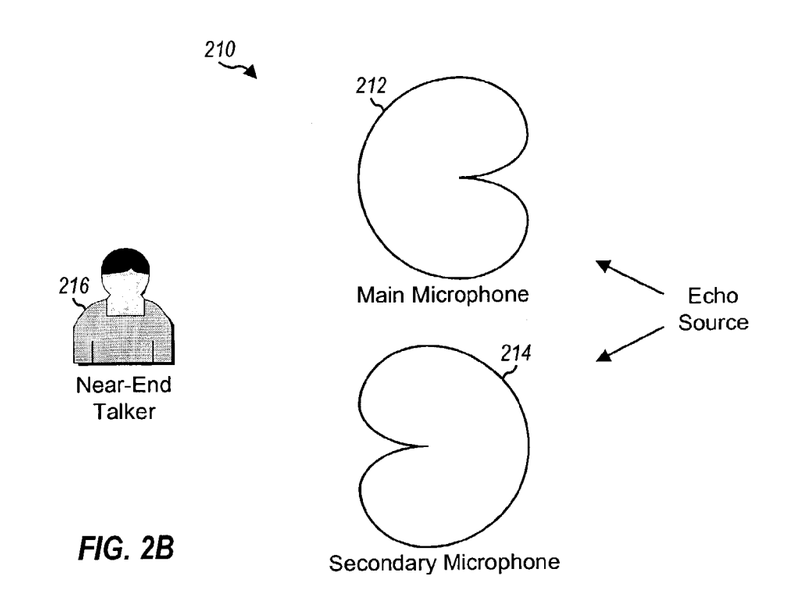

FIG. 2B shows another exemplary configuration for an array microphone 210. For this configuration, the array microphone comprises two uni-directional microphones 212 and 214 placed in close proximity to each other. The main lobe of uni-directional microphone 212 faces toward a near-end talker 216. Conversely, the main lobe of uni-directional microphone 214 faces away from the near-end talker. These two uni-directional microphones are thus placed facing opposite directions. Uni-directional microphone 212 is referred to as the first or main channel, and uni-directional microphone 214 is referred to as the second or secondary channel.

Figure 3:
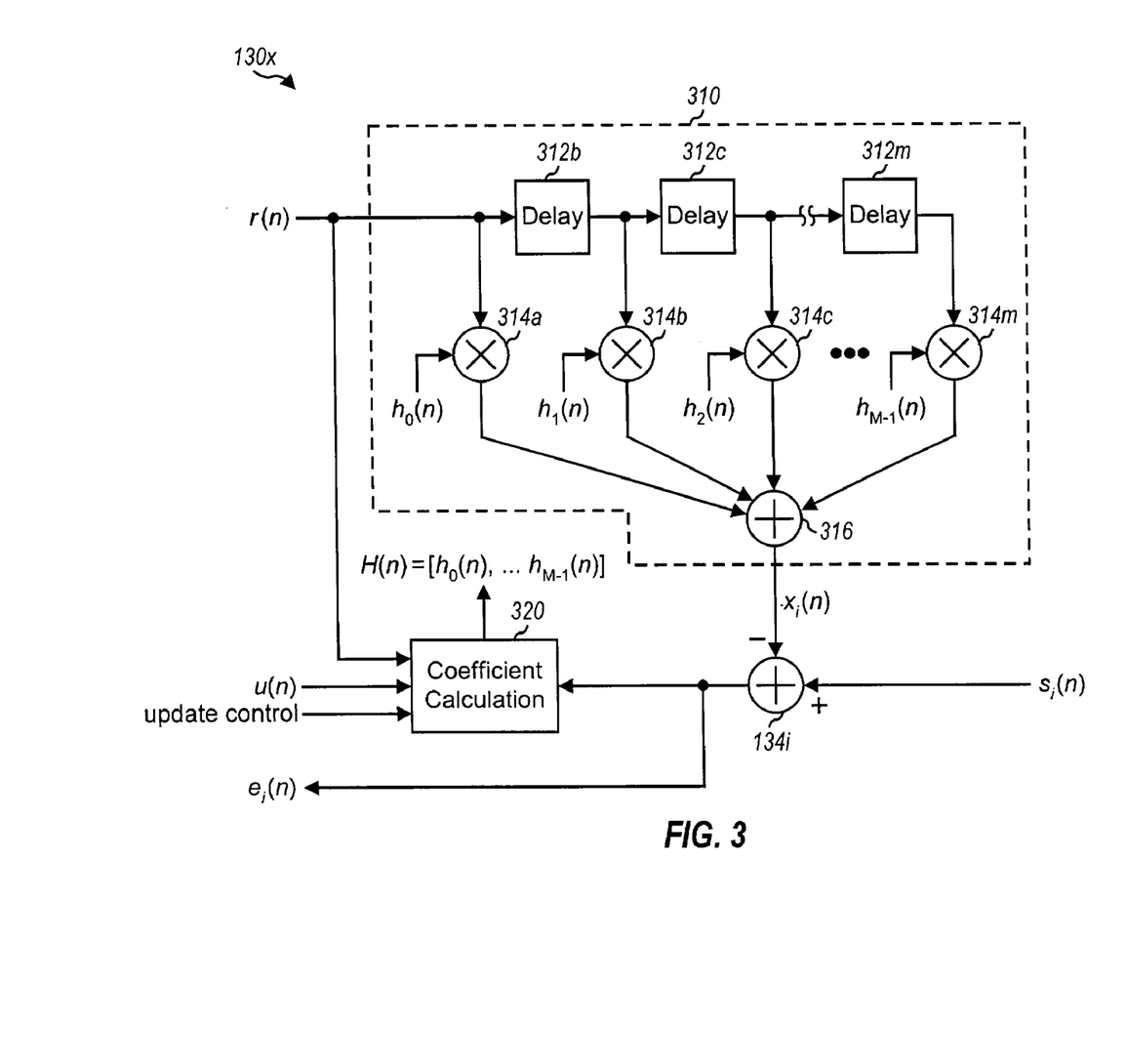
FIG. 3 shows a block diagram of an adaptive filter.

FIG. 3 shows a block diagram of an embodiment of an adaptive filter 130x, which may be used for each of adaptive filters 130a and 130b in FIG. 1. Adaptive filter 1030x includes a FIR filter 310, summer 134i, and a coefficient computation unit 320. An infinite impulse response (IIR) filter or some other filter architecture may also be used in place of the FIR filter. The following description is for channel i, which may be the main channel or the secondary channel.

Within FIR filter 310, the digital samples for the reference signal r(n) are provided to M-1 series-coupled delay elements 312b through 312m, where M is the number of taps of the FIR filter. Each delay element provides one sample period of delay. The signal r(n) and the outputs of delay elements 312b through 312m are provided to multipliers 314a through 314m, respectively. Each multiplier 314 also receives a respective filter coefficient $h_{i,j}(n)$ from coefficient calculation unit 320, multiplies its received samples with its filter coefficient $h_{i,j}(n)$, and provides output samples to a summer 316. For each sample period n, summer 316 sums the output samples from multipliers 314a through 314m and provides a filtered sample for that sample period. The filtered sample $x_i(n)$ for sample period n may be computed as:

$$x_i(n) = \sum_{j=0}^{M-1} h_{i,j}^* \cdot r(n-i), \qquad \text{Eq (1)}$$

where the symbol (*) denotes a complex conjugate. Summer 134i receives and subtracts the signal $x_i(n)$ from the signal $s_i(n)$ to provide the error signal $e_i(n)$.

Coefficient calculation unit 320 provides the set of M coefficients for FIR filter 310, which is denoted as $H_i(n) = [h_{i,0}(n), h_{i,1}(n), \ldots h_{i,M-1}(n)]$. Unit 320 further updates these coefficients based on a particular adaptive algorithm, which may be a least mean square (LMS), a normalized least mean square (NLMS), a recursive least square (RLS), a direct matrix inversion (DMI), or some other algorithm. The NLMS and other algorithms are described by B. Widrow and S.D. Sterns in a book entitled "Adaptive Signal Processing," Prentice-Hall Inc., Englewood Cliffs, N.J., 1986. The LMS, NLMS, RLS, DMI, and other adaptive algorithms are described by Simon Haykin in a book entitled "Adaptive Filter Theory", 3rd edition, Prentice Hall, 1996. The pertinent sections of these books are incorporated herein by reference.

Coefficient update unit 320 also receives the step size signal u(n) from adaptive step size control unit 238, which is used to control the manner in which the filter coefficients are updated. Unit 320 may also receive an update control signal that is used to enable the updating of the coefficients.

Figure 4A:
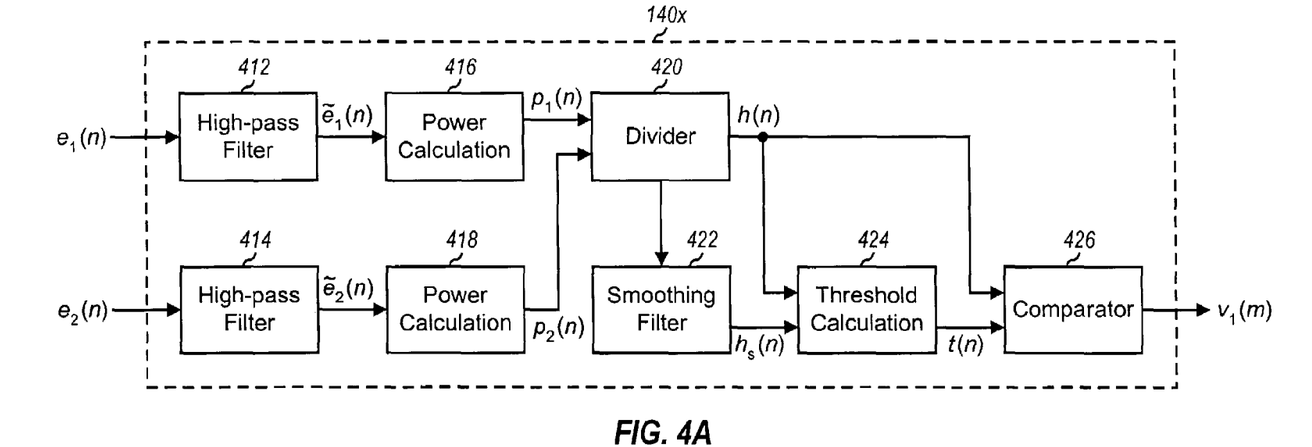
FIGS. 4A and 4B show block diagrams of two voice activity detectors for the near-end and far-end, respectively.

FIG. 4A shows a block diagram of a voice activity detector (VAD) 140x, which is a specific embodiment of voice activity detector 140 in FIG. 1. For this embodiment, VAD 140x detects for the presence of near-end voice based on the powers of the signals $e_1(n)$ and $e_2(n)$ received via the main and secondary channels, respectively. The near-end voice detection is further based on prior computed values for the powers of these signals, as described below.

For this embodiment, within VAD 140x, high-pass filters 412 and 414 respectively receive the signals $e_1(n)$ and $e_2(n)$, filter these signals with the same set of filter coefficients to remove low frequency components, and provide filtered signals $\tilde{e}_1(n)$ and $\tilde{e}_2(n)$, respectively. Power calculation units 416 and 418 then respectively receive the filtered signals $\tilde{e}_1(n)$ and $\tilde{e}_2(n)$, compute the power of the filtered signals, and provide computed powers $p_1(n)$ and $p_2(n)$, respectively. Power calculation units 416 and 418 may further average the computed powers. In this case, the averaged computed powers may be expressed as:

$$p_1(n) = \alpha_e \cdot p_1(n-1) + (1-\alpha_e) \cdot \tilde{e}_1(n) \cdot \tilde{e}_1^{108}(n), \text{ and} \qquad \text{Eq (2a)}$$

$$p_2(n) = \alpha_e \cdot p_2(n-1) + (1-\alpha_e) \cdot \tilde{e}_2(n) \cdot \tilde{e}_2^{108}(n) \qquad \text{Eq (2b)}$$

where $\alpha_e$ is a constant that determines the amount of averaging and is selected such that $1 > \alpha_e > 0$. A large value for $\alpha_e$ corresponds to more averaging and a lower bandwidth. The term $p_1(n)$ includes the signal power from the near-end talker. The term $p_2(n)$ includes both the designated signal and noise powers for the configuration shown in FIG. 2A, and mostly the noise power for the configuration shown in FIG. 2B.

A divider unit 420 then receives the averaged powers $p_1(n)$ and $p_2(n)$ and calculates a ratio h(n) of these two powers. The ratio h(n) may be expressed as:

$$h(n) = \frac{p_1(n)}{p_2(n)}. \qquad \text{Eq (3)}$$

The ratio h(n) indicates the amount of desired signal power relative to the total power (or the noise power). A large value for h(n) indicates that the desired signal power is large relative to the total power, which may be the case if near-end voice is present. Conversely, a small value for h(n) indicates that the desired signal power is small relative to the total power, which may be the case if near-end voice is not present.

A smoothing filter 422 receives and filters or smoothes the ratio h(n) to provide a smoothed ratio $h_s(n)$. The smoothing may be expressed as:

$$h_s(n) = \alpha_h \cdot h_s(n-1) + (1-\alpha_h) \cdot h(n), \qquad \text{Eq (4)}$$

where $\alpha_h$ is a constant that determines the amount of smoothing and is selected as $1 > \alpha_h > 0$.

A threshold calculation unit 424 receives the instantaneous ratio h(n) and the smoothed ratio $h_s(n)$ and determines a threshold t(n). To obtain t(n), an initial threshold $t_{a1}(n)$ is first computed as:

$$t_{a1}(n) = \begin{cases} \alpha_h \cdot t_{a1}(n-1) + & \text{if } \beta_2 h_s(n) \geq \\ (1-\alpha_h) \cdot h(n), & h(n) \geq \beta_1 h_s(n) \\ t_{a1}(n-1), & \text{if } h(n) > \beta_2 h_s(n) \text{ OR} \\ & h(n) < \beta_1 h_s(n), \end{cases} \qquad \text{Eq (5)}$$

where $\beta_1$ and $\beta_2$ are constants and are selected such that $\beta_2 > \beta_1 > 0$. In equation (5), if the instantaneous ratio h(n) falls within a range of values between $\beta_2 h_s(n)$ and $\beta_1 h_s(n)$, then the initial threshold $t_{a1}(n)$ is computed based on the instantaneous ratio h(n) in the same manner as the smoothed ratio $h_s(n)$, as shown in equation (4). Otherwise, if the instantaneous ratio h(n) falls outside this range, then the initial threshold for the prior sample period is retained (i.e., $t_{a1}(n) = t_{a1}(n-1)$ and the initial threshold $t_{a1}(n)$ is not updated with h(n)). This prevents the threshold from being updated under abnormal condition when the h(n) may be outside the normal range of values.

The initial threshold $t_{a1}(n)$ is further constrained to be within a range of values defined by $T_{max}$ and $T_{min}$. The threshold $t(n)$ is then set equal to the constrained initial threshold $t_{a1}(n)$, which may be expressed as:

$$t(n) = \begin{cases} T_{max}, & \text{if } t_{a1}(n) > T_{max}, \\ t_{a1}(n), & \text{if } T_{max} \geq t_{a1}(n) \geq T_{min}, \text{ and} \\ T_{min}, & \text{if } T_{min} > t_{a1}(n). \end{cases} \quad \text{Eq (6)}$$

where $T_{max}$ and $T_{min}$ are constants selected such that $T_{max} > T_{min}$ The threshold $t(n)$ is thus computed based on a running average of the ratio $h(n)$, where large and small values of $h(n)$ are excluded from the averaging. Moreover, the threshold $t(n)$ is further constrained within the range of values defined by $T_{max}$ and $T_{min}$. The threshold $t(n)$ is thus adaptively computed based on the operating environment.

A comparator 426 then receives the ratio $h(n)$ and the threshold $t(n)$, averages these quantities over each frame, compares the two averaged quantities $h(m)$ and $t(m)$ for frame m, and provides the voice detection signal $v_1(m)$ based on the comparison results. The comparison may be expressed as:

$$v_1(m) = \begin{cases} 1, & \text{if } h(m) \geq t(m), \\ 0, & \text{if } h(m) < t(m). \end{cases} \quad \text{Eq (7)}$$

For each frame, the ratio $h(m)$ is computed by accumulating B values for $h(n)$ for that frame and dividing by B. The threshold $t(m)$ is computed in similar manner. The voice detection signal $v_1(m)$ is set to 1 to indicate that near-end voice is detected and set to 0 to indicate that near-end voice is not detected.

Figure 4B:
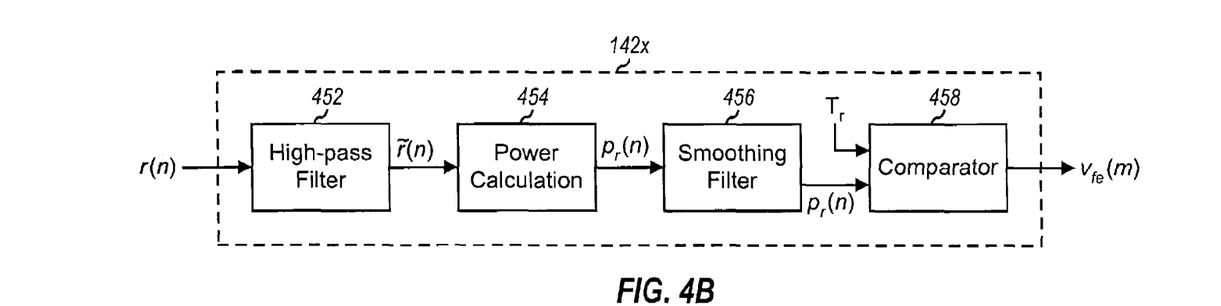

FIG. 4B shows a block diagram of a far-end voice activity detector (FE-VAD) 142x, which is a specific embodiment of FE-VAD 142 in FIG. 1. For this embodiment, FE-VAD 142x detects for the presence of far-end voice based on the power of the far-end signal r(n).

For this embodiment, within FE-VAD 142x, a high-pass filter 452 receives and filters the far-end signal r(n) with a set of filter coefficients to remove low frequency components. A power calculation unit 454 then receives the filtered signal $\tilde{r}(n)$ from high-pass filter 452, computes the power of the filtered signal as $p_r(n) = \tilde{r}(n) \cdot \tilde{r}^{108}(n)$, and provides the computed power $p_r(n)$. A smoothing filter 456 then filters the power $p_r(n)$ to provide a smoothed power $p_{rs}(n)$, which may be expressed as:

$$p_{rs}(n) = \alpha_r \cdot p_r(n-1) + (1-\alpha_r) \cdot \tilde{r}(n) \tilde{r}^{108}(n), \quad \text{Eq (8)}$$

where $\alpha_r$ is a constant that determines the amount of smoothing for $p_r(n)$ and is selected such that $1 > \alpha_r > 0$ A comparator 458 then receives the smoothed power $p_{rs}(n)$ and a threshold $T_r$, averages the power over each frame, compares the averaged power $P_{rs}(m)$ against the threshold $T_r$, and provides the far-end voice detection signal $V_{fe}(m)$ based on the comparison results. The comparison may be expressed as:

$$v_{fe}(m) = \begin{cases} 1, & \text{if } p_{rs}(m) \geq T_r, \\ 0, & \text{if } p_{rs}(m) < T_r. \end{cases} \quad \text{Eq (9)}$$

The voice detection signal $v_{fe}(m)$ is set to 1 to indicate that far-end voice is detected and set to 0 to indicate that far-end voice is not detected.

Figure 5:
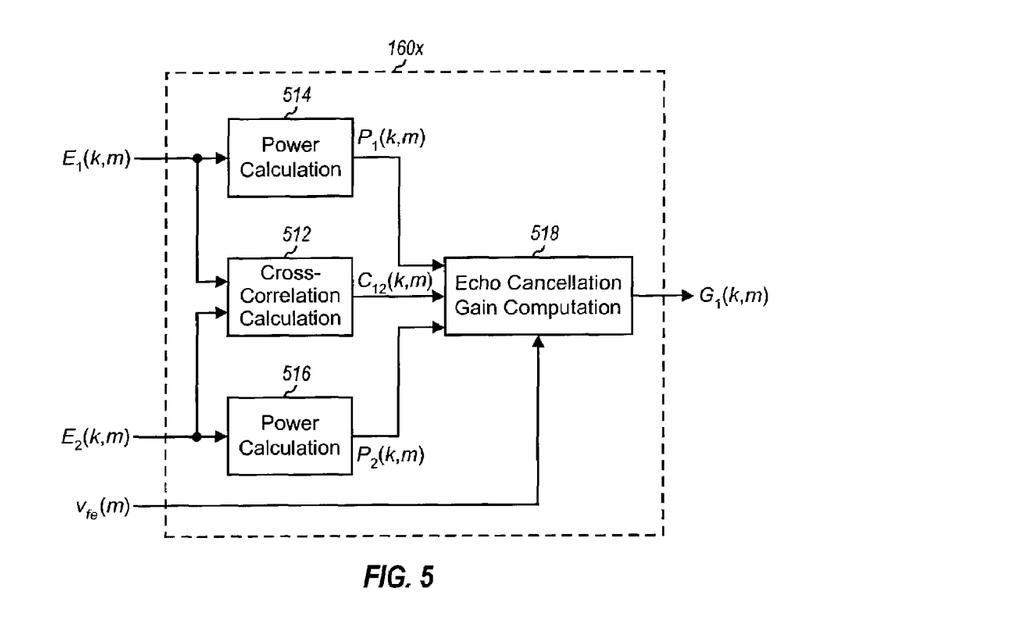
FIG. 5 shows a block diagram of a dual-channel spectral echo cancellation control unit.

FIG. 5 shows a block diagram of a dual-channel spectral echo cancellation control unit 160x, which is a specific embodiment of control unit 160 in FIG. 1. In this embodiment, the far-end voice detection signal $v_{fe}(m)$ is used to control the operation of control unit 160x and the amount of echo cancellation.

For this embodiment, within control unit 160x, a cross-correlation calculation unit 512 receives the frequency-domain signals $E_1(k,m)$ and $E_2(k,m)$, computes a cross-correlation of these two signals, and further averages the cross-correlation result. The averaged cross-correlation $C_{12}(k,m)$ may be expressed as:

$$C_{12}(k,m) = \alpha_{12} \cdot C_{12}(k,m-1) + (1-\alpha_{12}) \cdot E_1(k,m) \, E_2^*(k,m), \quad \text{Eq (10)}$$

where $\alpha_{12}$ is a constant that determines the amount of averaging and is selected as $1 > \alpha_{12} > 0$, and $E_2^*(k,m)$ is the complex conjugate of $E_2(k,m)$.

The cross-correlation computation in equation (10) as well as many of the frequency-domain computations described below is performed for each of the B frequency bins (i.e., on a per-bin basis), for $k \in K$ where K is the set of all B frequency bins. For simplicity, this designation is omitted from the equations.

Power calculation units 514 and 516 respectively receive the signals $E_1(k,m)$ and $E_2(k,m)$, compute the powers of these signals, average the computed powers, and provides the averaged powers $P_1(k,m)$ and $P_2(k,m)$, respectively. These powers may be expressed as:

$$P_1(k,m) = \alpha_{p1} P_1(k,m-1) + (1-\alpha_{p1}) \cdot E_1(k,m) \cdot E_1^{108}(k,m), \text{ and} \quad \text{Eq (11a)}$$

$$P_2(k,m) = \alpha_{p2} \cdot P_2(k,m-1) + (1-\alpha_{p2}) \cdot E_2(k,m) \cdot E_2^{108}(k,m) \quad \text{Eq (11b)}$$

where $\alpha_{p1}$, and $\alpha_{p2}$ are constants that determine the amount for averaging for $P_1(k,m)$ and $P_2(k,m)$, respectively, and are selected such that $1 > \alpha_{p1} > 0$ and $1 > \alpha_{p2} > 0$. The same or different amount of averaging may be performed for the powers $P_1(k,m)$ and $P_2(k,m)$.

An echo cancellation gain computation unit 518 receives the far-end voice detection signal $v_{fe}(m)$, the cross-correlation $C_{12}(k,m)$, and the signal powers $P_1(k,m)$ and $P_2(k,m)$. Unit 518 then generates the echo cancellation gain $G_1(k,m)$ that is used by echo cancellation and noise suppression unit 180 to perform echo cancellation. In particular, the gain $G_1(k,m)$ is (1) a small value if more echo cancellation is to be performed when large echo is detected and (2) equal to a maximum value if no echo cancellation is to be performed. The gain $G_1(k,m)$ is a real value that, in an embodiment, ranges between 0 and 1.0 (i.e., $1 \geq G_1(k,m) \geq 0$).

To obtain the gain $G_1(k,m)$, an initial gain $G_{a1}(k,m)$ is first computed as follows:

$$G_{a1}(k,m) = \frac{1 - \eta \cdot C_{12}(k,m)}{P_1(k,m) \cdot P_2(k,m)}, \quad \text{Eq (12)}$$

where η is a positive constant used to adjust the correlation gain and is selected within a range from 0 to 1.0 (i.e., 1>η>0).

The initial gain $G_{a1}(k,m)$ is then constrained to be within a range of values defined by $G_{max}$ and $G_{min}$. The constrained gain $G_{a2}(k,m)$ may be expressed as:

$$G_{a2}(k, m) = \begin{cases} G_{max}, & \text{if } G_{a1}(k, m) > G_{max}, \\ G_{a1}(k, m), & \text{if } G_{max} \geq G_{a1}(k, m) \geq G_{min}, \text{ and} \\ G_{min}, & \text{if } G_{min} > G_{a1}(k, m). \end{cases} \quad \text{Eq (13)}$$

where $G_{max}$ and $G_{min}$ are constants selected such that $1 \geq G_{max} > G_{min} \geq 0$.

The echo cancellation gain $G_1(k,m)$ is then set to either the constrained gain $G_{a2}(k,m)$ or a specified value (e.g., 1) depending on the far-end voice detection signal $v_{fe}(m)$, as follows:

$$G_1(k, m) = \begin{cases} G_{a2}(k, m), & \text{if } v_{fe}(m) = 1, \\ 1, & \text{if } v_{fe}(m) = 0. \end{cases} \quad \text{Eq (14)}$$

As shown in equation (14), the gain $G_1(k,m)$ is set to $G_{a2}(k,m)$ if the signal $v_{fe}(m)$ indicates that far-end voice is detected and echo cancellation is enabled, and set to 1 if far-end voice is not detected and echo cancellation is not enabled.

Figure 6:
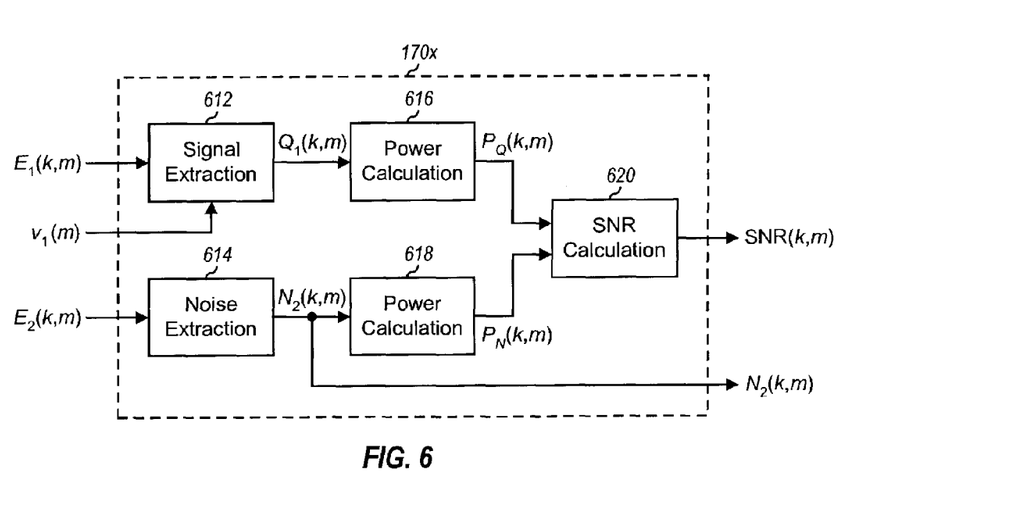
FIG. 6 shows a block diagram of an ambient noise estimator.

FIG. 6 shows a block diagram of an ambient noise estimator 170x, which is a specific embodiment of ambient noise estimator 170 in FIG. 1. Estimator 170x detects for the desired signal received via the main channel and for noise received via the secondary channel, and provides the SNR (k,m) based on the detected desired signal and noise.

For this embodiment, within estimator 170x, a signal extracting unit 612 receives the frequency-domain signal $E_1(k,m)$, estimates the magnitude of the desired signal component in $E_2(k,m)$ based on the voice activity detection signal $v_1(m)$, and provides a desired signal estimate $Q_1(k, m)$. Correspondingly, a noise extracting unit 614 receives the frequency-domain signal $E_2(k,m)$, estimates the magnitude of the noise component in $E_2(k,m)$ based on a minimum statistics based method or some other methods known in the art, and provides the noise estimate $N_2(k,m)$.

A power calculation unit 616 receives the signal magnitude $Q_1(k,m)$, computes its power, averages the computed signal power, and provides the averaged signal power $P_Q(k, m)$. Similarly, a power calculation unit 618 receives the noise magnitude $N_2(k,m)$, computes its power, averages the computed noise power, and provides the averaged noise power $P_N(k,m)$. The averaged signal and noise powers may be expressed as:

$$P_Q(k,m) = \alpha_Q \cdot P_Q(k,m-1) + (1-\alpha_Q) \cdot Q_1(k,m) \cdot Q_1(k,m), \text{ and} \quad \text{Eq (15a)}$$

$$P_N(k,m) = \alpha_N \cdot P_N(k,m-1) + (1-\alpha_N) \cdot N_2(k,m) \cdot N_2(k,m), \quad \text{Eq (15b)}$$

where $\alpha_Q$ and $\alpha_N$ are constants that determine the amount of averaging for the signal power and the noise power, respectively, and are selected such that $1 > \alpha_Q > 0$ and $1 > \alpha_N > 0$. The constants $\alpha_Q$ and $\alpha_N$ may be the same or different.

An SNR calculation unit 620 receives the averaged signal and noise powers $P_Q(k,m)$ and $P_N(k,m)$, computes a signal-to-noise ratio (SNR) based on these powers, and further averages the computed SNR to provide the signal-to-noise ratio SNR(k,m). The SNR(k,m) may be expressed as:

$$SNR(k, m) = \alpha_{snr} \cdot SNR(k, m-1) + (1 - \alpha_{snr}) \cdot \frac{P_Q(k, m)}{P_N(k, m)}, \quad \text{Eq (16)}$$

where $\alpha_{snr}$ is a constant that determines the amount of averaging for the SNR and is selected such that $1 > \alpha_{snr} > 0$.

Figure 7:
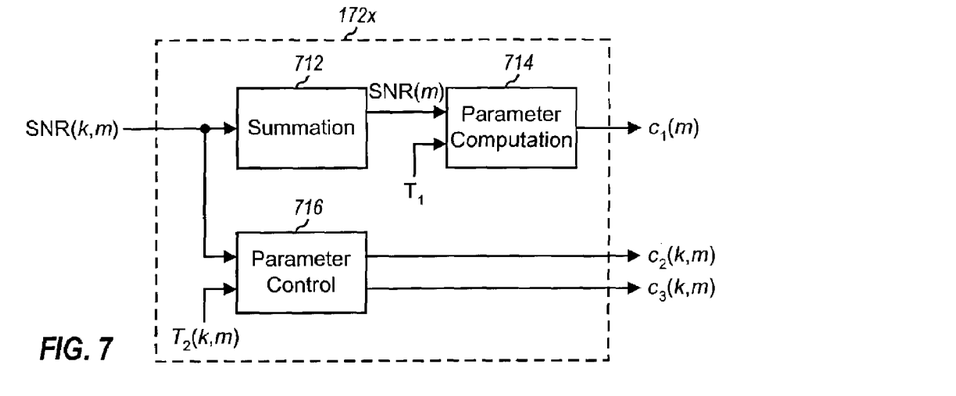
FIG. 7 shows a block diagram of a noise suppression control unit.

FIG. 7 shows a block diagram of a noise suppression control unit 172x, which is a specific embodiment of noise suppression control unit 172 in FIG. 1. For this embodiment, within control unit 172x, a summer unit 712 receives the signal-to-noise ratio SNR(k,m), performs a summation of the SNR values for all B frequency bins, and provides an overall SNR, SNR(m). The summation may be expressed as:

$$SNR(m) = \sum_{k=0}^{B-1} SNR(k, m). \quad \text{Eq (17)}$$

A comparator 712 then receives the overall SNR(M), compares it against a threshold $T_1$, and provides the control signal $c_1(m)$. The comparison operation for $c_1(m)$ may be expressed as:

$$c_1(m) = \begin{cases} 1, & \text{if } SNR(m) > T_1, \\ 0, & \text{otherwise.} \end{cases} \quad \text{Eq (18)}$$

The control signal $c_1(m)$ is set to 1 if the SNR is sufficiently high and set to 0 otherwise.

A parameter control unit 716 also receives the signal-to-noise ratio SNR(k,m) and derives the second and third control signals $c_2(k,m)$ and $c_3(k,m)$ based on the SNR(k,m) and a threshold $T_2(k,m)$. The control signals $c_2(k,m)$ and $c_3(k,m)$ are both functions of frequency index k, and their derivation is on a per frequency bin basis. The control signals $c_2(k,m)$ and $c_3(k,m)$ may be derived as:

$$c_2(k, m) = \frac{\beta_2 \cdot SNR(k, m)}{T_2(k, m)}, \text{ and} \quad \text{Eq (19a)}$$

$$c_3(k, m) = \frac{\beta_3 \cdot SNR(k, m)}{T_2(k, m)}, \quad \text{Eq (19b)}$$

where $\beta_2$ and $\beta_3$ are positive constants and are selected such that $1 > \beta_2 > \beta_3 > 0,1$ and $\beta_3 > \beta_2$. As shown in equations (19a) and (19b), the control signals $c_2(k,m)$ and $c_3(k,m)$ are both scaled versions of SNR(k,m).

Figure 8:
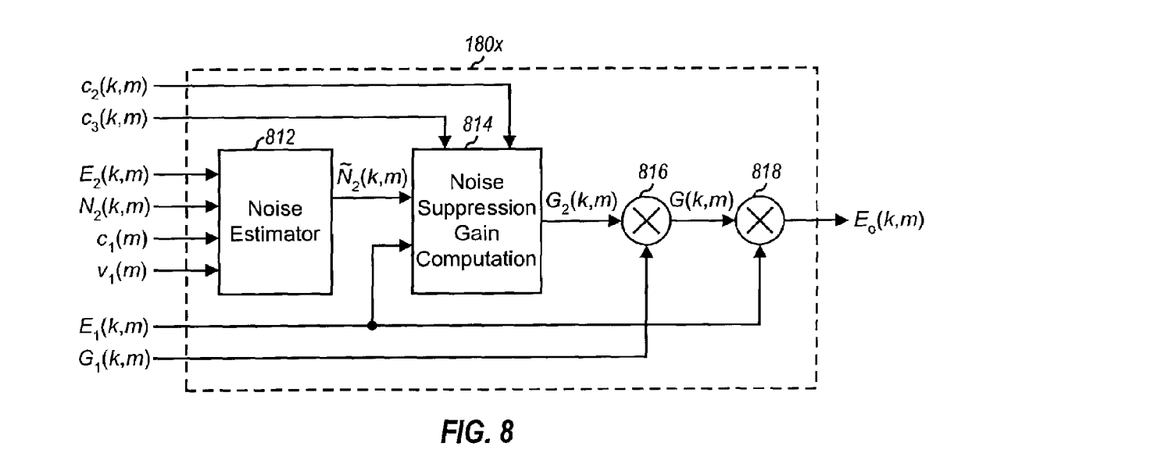
FIG. 8 shows a block diagram of a dual-channel echo cancellation and noise suppression unit.

FIG. 8 shows a block diagram of a dual-channel echo cancellation and noise suppression unit 180x, which is a specific embodiment of dual-channel echo cancellation and noise suppression unit 180 in FIG. 1.

For this embodiment, within unit 180x, a noise estimator 812 receives the frequency-domain signal $E_2(k,m)$, the noise magnitude estimate $N_2(k,m)$, the first control signal $c_1(m)$, and the voice detection signal $v_1(m)$. Noise estimator 812 determined a final estimate of the noise in the frequency-domain signal $E_2(k,m)$ and provides a final noise magnitude estimate $\hat{N}_2(k,m)$, which may be expressed as:

$$\tilde{N}_2(k, m) = \qquad \text{Eq (20)}$$

$$\begin{cases} \gamma_{a1} \cdot N_2(k, m) + \gamma_{a2} \cdot |E_2(k, m)|, & \text{if } c_1(m) = 1 \text{ and } v_1(m) = 1, \\ \gamma_{b1} \cdot N_2(k, m) + \gamma_{b2} \cdot |E_2(k, m)|, & \text{if } c_1(m) = 1 \text{ and } v_1(m) = 0, \\ N_2(k, m) & \text{if } c_1(m) = 0, \end{cases}$$

where $\gamma_{a1}$, $\gamma_{b1}$, $\gamma_{b2}$ are constants and are selected such that $\gamma_{a1} > \gamma_{b1} > 0$ and $\gamma_{b2} > \gamma_{a2} > 0$. As shown in equation (20), the final noise magnitude estimate $\tilde{N}_2(k,m)$ is set equal to the noise magnitude estimate $N_2(k,m)$ if the first control signal $c_1(m)$ is set to zero (i.e., low SNR detected for the signal $E_2(k,m)$). Otherwise, the final noise magnitude estimate $\tilde{N}_2(k,m)$ is set equal to the sum of a scaled noise magnitude estimate, $\gamma_{x1} \cdot N_2(k,m)$, and a scaled signal magnitude, $\gamma_{x2} \cdot |E_2(k,m)|$ (where $\gamma_x$ can be equal to $\gamma_a$ or $\gamma_b$). The constants $\gamma_{a1}$, $\gamma_{a2}$, $\gamma_{b1}$, and $\gamma_{b2}$ are selected such that the final noise magnitude estimate $\tilde{N}_2(k,m)$ includes more of the noise magnitude estimate $N_2(k,m)$ and less of the signal magnitude $|E_2(k,m)|$ when $v_1(m)=1$, indicating that near-end voice is detected. Conversely, the final noise magnitude estimate $\tilde{N}_2(k,m)$ includes less of the noise magnitude estimate $N_2(k,m)$ and more of the signal magnitude $|E_2(k,m)|$ when $v_1(m)=0$, indicating that near-end voice is not detected.

A noise suppression gain computation generator 814 receives the frequency-domain signal $E_1(k,m)$ and the final noise magnitude estimate $\tilde{N}_2(k,m)$ and generates a noise suppression gain $G_2(k,m)$ used to suppress noise in the signal $E_1(k,m)$. The gain $G_2(k,m)$ is a real value and its magnitude is indicative of the amount of noise suppression (i.e., $G_2(k,m)$ is a large value for more noise suppression and a small value for less noise suppression).

To obtain the gain $G_2(k,m)$, an initial gain $G_{b1}(k,m)$ is first computed as follows:

$$G_{b1}(k, m) = \frac{|E_1(k, m)|}{c_2(k, m) \cdot \tilde{N}_2(k, m)} - 1. \qquad \text{Eq (21)}$$

As shown in equation (21), the initial gain $G_{b1}(k,m)$ is proportional to the signal-to-noise ratio computed as $|E_1(k,m)|/\tilde{N}_2(k,m)$. The division by $C_2(k,m)$ is to obtain a unit-less quantity. The subtraction by 1 is to obtain an initial SNR estimate.

The initial gain is then constrained to be a positive value, as follows:

$$G_{b2}(k, m) = \begin{cases} G_{b1}(k, m), & \text{if } G_{b1}(k, m) \geq 0, \\ 0, & \text{if } G_{b1}(k, m) < 0. \end{cases} \qquad \text{Eq (22)}$$

An SNR gain estimate, $G_{SNR}(k,m)$, is then computed as follows:

$$G_{SNR}(k, m) = \frac{\lambda \cdot |\tilde{E}_1(k, m-1)|}{c_2(k, m) \cdot \tilde{N}_2(k, m)} + (1 - \lambda) \cdot G_{b2}(k, m), \qquad \text{Eq (23)}$$

where $\lambda$ is a positive constant selected such that $1 > \lambda > 0$, and $$\tilde{E}_1(k, m-1) = G_2(k, m-1) \cdot E_1(k, m-1) \qquad \text{Eq (24)}$$

As shown in equation (23), the gain $G_{SNR}(k,m)$ includes two parts. The first part is a scaled version of the initial gain for the prior frame (i.e., $\alpha \cdot G_{b1}(k,m-1)$, where $\alpha$ is the scaling factor that includes several terms). The second part $(1-\lambda) \cdot G_{b2}(k,m)$ is a scaled version of the initial gain for the current frame.

An intermediate gain $G_{b3}(k,m)$ is then computed as:

$$G_{b3}(k, m) = \frac{G_{SNR}(k, m)}{1 + G_{SNR}(k, m)}. \qquad \text{Eq (25)}$$

The gain $G_{b2}(k,m)$ is finally computed as:

$$G_2(k,m) = \max\{G_{b3}(k,m), c_3(k,m)\}. \qquad \text{Eq (26)}$$

A multiplier 816 then multiples the first gain $G_1(k,m)$ from spectral echo cancellation control unit 160 with the gain $G_2(k,m)$ to provide the overall frequency-domain gain $G(k,m)$, which may be expressed as:

$$G(k,m) = G_1(k,m) \cdot G_2(k,m). \qquad \text{Eq (27)}$$

The overall gain $G(k,m)$ is dependent on the gains $G_1(k,m)$ and $G_2(k,m)$. If the SNR of the signal on the main channel is high, then the gain $G_2(k,m)$ is larger (as shown in equation (21)) and more of the signal is provided to the output.

A multiplier 818 next multiples the frequency-domain signal $E_1(k,m)$ with the overall gain $G(k,m)$ to provide the frequency-domain output signal $E_0(k,m)$, which may be expressed as:

$$E_0(k,m) = E_1(k,m) \cdot G(k,m). \qquad \text{Eq (28)}$$

Figure 9:
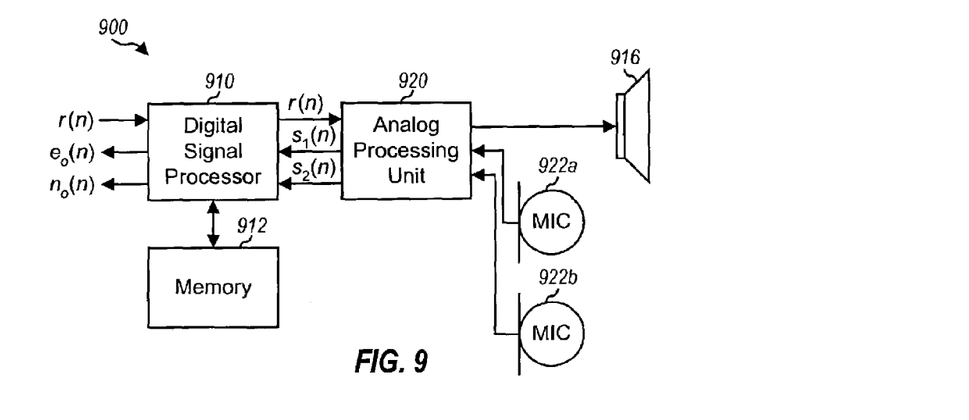
FIG. 9 shows an implementation of an echo cancellation and noise suppression system.

FIG. 9 shows a diagram of an implementation of an echo cancellation and noise suppression system 900. In this implementation, system 900 includes a digital signal processor (DSP) 910, a memory 912, an analog processing unit 920, a speaker 916, and microphones 922a and 922b. Digital signal processor 910 may be designed to implement various processing units for echo cancellation and noise suppression, such as the processing units shown in FIG. 1. Memory 912 provides storage for program codes and data used by digital signal processor 910. Analog processing unit 920 performs the analog processing and may include D/A converter 112 and power amplifier 114 in the output path and adjustable amplifiers 124 and A/D converters 126 in the input path. Digital signal processor 910 may then implement the remaining processing units of system 100 in FIG. 1.

For clarity, specific embodiments of various processing units for echo cancellation and noise suppression system 100 have been described above. Various alternative designs may be used for these processing units, and this is within the scope of the invention. Moreover, certain processing units may be omitted and/or different processing units may be added.

The echo cancellation and noise suppression techniques described herein may be implemented by various means. For example, these techniques may be implemented in hardware, software, or a combination thereof. For a hardware implementation, the processing units used to implement the echo cancellation and noise suppression may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the echo cancellation and noise suppression techniques may be implemented with modules (e.g., procedures, functions, and so on) that perform the functions described herein. The software codes may be stored in a memory unit (e.g., memory 912 in FIG. 9) and executed by a processor (e.g., digital signal processor 910).

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An echo cancellation and noise suppression system comprising:
    an echo cancellation control unit operative to derive a first gain used for echo cancellation based on at least two intermediate signals for at least two microphones of an array microphone;
    a noise estimator operative to provide a first signal indicative of background noise detected in the intermediate signals;
    a noise suppression control unit operative to provide at least one control signal for noise suppression based on the first signal; and
    an echo cancellation and noise suppression unit operative to cancel echo and suppress noise in a designated one of the intermediate signals based on the first gain and the at least one control signal.

2. The system of claim 1, wherein the echo cancellation and noise suppression unit is further operative to derive a second gain used for noise suppression.

3. The system of claim 1, wherein the intermediate signals are frequency-domain signals, and wherein the echo cancellation and noise suppression unit is operative to cancel echo and suppress noise in the frequency domain.

4. The system of claim 3, wherein the echo cancellation and noise suppression unit is operative to cancel echo and suppress noise for each of a plurality of frequency bins.

5. The system of claim 1, wherein the first gain is derived based on powers of the intermediate signals and cross-correlation between the intermediate signals.

6. The system of claim 2, wherein the second gain is derived based on signal power of the designated intermediate signal and noise powers of remaining ones of the intermediate signals.

7. The system of claim 1, wherein the echo cancellation and noise suppression unit is operative to suppress nonlinear echo and large amount of noise in low signal-to-noise ratio (SNR) environment.

8. The system of claim 1, wherein the at least two microphones are placed in close proximity to each other and include an omni-directional microphone and a uni-directional microphone having a main lobe facing a voice source.

9. The system of claim 1, wherein the at least two microphones are placed in close proximity to each other and include at least two uni-directional microphones, wherein one of the uni-directional microphones has a main lobe facing a voice source and another one of the uni-directional microphone has a main lobe facing away from the voice source.

10. An echo cancellation and noise suppression system comprising:
    at least two microphones forming an array microphone and operative to provide at least two microphone input signals;
    an echo cancellation control unit operative to receive at least two intermediate signals derived from the microphone input signals and provide a first gain used for echo cancellation;
    a noise estimator operative to detect for background noise in the intermediate signals and provide a first signal indicative of the detected background noise;
    a noise suppression control unit operative to receive the first signal and determine at least one control signal for noise suppression; and
    an echo cancellation and noise suppression unit operative to derive a second gain based in part on the at least one control signal and to cancel echo and suppress noise in a designated one of the intermediate signals based on the first and second gains.

11. The system of claim 10, further comprising:
    a first voice activity detector operative to detect for far-end activity, and wherein the echo cancellation is performed based on the detected far-end activity.

12. The system of claim 10, further comprising:
    a second voice activity detector operative to detect for activity in the microphone input signals, and wherein the noise suppression is performed based on the detected near-end activity.

13. The system of claim 10, further comprising:
    at least two echo canceller units each operative to process a respective microphone input signal from one of the at least two microphones and provide one of the at least two intermediate signals having a portion of echo in the microphone input signal canceled.

14. The system of claim 10, wherein the intermediate signals are frequency-domain signals, and wherein the echo cancellation and noise suppression unit is operative to cancel echo and suppress noise in the frequency domain.

15. The system of claim 10, wherein the at least two microphones include an omni-directional microphone and a uni-directional microphone having a main lobe facing a voice source.

16. The system of claim 10, wherein the at least two microphones include at least two uni-directional microphones, wherein one of the uni-directional microphones has a main lobe facing a voice source and another one of the uni-directional microphone.

17. An apparatus suitable for canceling echo and suppressing noise, comprising:
    means for deriving a first gain used for echo cancellation based on at least two intermediate signals for at least two microphones of an array microphone;
    means for deriving a second gain used for noise suppression based on detected background noise in the intermediate signals;
    means for canceling echo in a designated one of the intermediate signals based on the first gain; and
    means for suppressing noise in the designated intermediate signal based on the second gain.

18. The apparatus of claim 17, further comprising:
    means for detecting background noise in the intermediate signals.

19. The apparatus of claim 17, further comprising:
  means for canceling echo in each of at least two input signals from the at least two microphones to provide a corresponding intermediate signal.

20. A method of canceling echo and suppressing noise, comprising:
  deriving a first gain used for echo cancellation based on at least two intermediate signals for at least two microphones of an array microphone;
  deriving a second gain used for noise suppression based on detected background noise in the intermediate signals;
  canceling echo in a designated one of the at least two intermediate signals based on the first gain; and
  suppressing noise in the designated intermediate signal based on the second gain.

21. The method of claim 20, further comprising:
  detecting for far-end activity, and wherein the canceling is performed based on the detected far-end activity.

22. The method of claim 20, further comprising:
  detecting for near-end activity in the intermediate signals, and wherein the suppressing is performed based on the detected near-end activity.

23. The method of claim 20, further comprising:
  receiving at least two microphone input signals from the at least two microphones; and
  canceling a portion of echo in the at least two microphone input signals to provide the intermediate signals having residual echo.

* * * * *